United States Patent [19]

Fortier et al.

[11] Patent Number: 4,934,018
[45] Date of Patent: Jun. 19, 1990

[54] PARALLEL ARM CAR WASH DRYER WITH MULTISPEED CONTOUR FOLLOW

[75] Inventors: Dana R. Fortier, Vernon; Timothy H. Wentzell, South Windsor; Zbigniew M. Janikowski, Hartford, all of Conn.

[73] Assignee: Fabrication Specialists, Inc., Manchester, Conn.

[21] Appl. No.: 234,321

[22] Filed: Aug. 18, 1988

[51] Int. Cl.$^5$ ............................................. B60S 3/06
[52] U.S. Cl. ..................... 15/312 R; 15/316 R; 15/319; 15/DIG. 2; 34/229; 34/243 C
[58] Field of Search ............... 15/312 R, 316 R, 319, 15/DIG. 2; 34/243 C, 229; 134/123, 45, 57 R

[56] References Cited

U.S. PATENT DOCUMENTS

| | | | |
|---|---|---|---|
| 3,196,888 | 7/1965 | Rousseau | 134/45 |
| 3,323,228 | 6/1967 | Maxwell | 34/229 |
| 3,409,995 | 11/1968 | Greenwood et al. | 34/87 |
| 3,410,284 | 11/1968 | Burger | 134/57 R |
| 3,442,027 | 5/1969 | Hurwitz | 34/229 X |
| 3,533,422 | 10/1970 | Alimanestiano | 134/45 |
| 3,559,659 | 2/1971 | Gougoulas | 134/45 |
| 3,584,395 | 6/1971 | Peters | 34/229 |
| 3,590,417 | 7/1971 | Emanual | 15/302 |
| 3,613,255 | 10/1971 | Capra | 34/54 |
| 3,898,793 | 5/1974 | Kamiya | 34/229 |
| 4,559,721 | 12/1985 | Hanna | 15/316 R X |
| 4,562,848 | 1/1986 | Messing et al. | 134/125 |
| 4,563,788 | 1/1986 | Kobayashi | 34/243 C X |
| 4,587,688 | 5/1986 | Gougoulas | 15/316 R |
| 4,651,442 | 3/1987 | McIntyre | 34/229 |
| 4,718,439 | 1/1988 | Gorra et al. | 134/57 R |
| 4,730,401 | 3/1988 | Machin | 34/43 |
| 4,794,938 | 1/1989 | Petit | 134/123 X |
| 4,809,392 | 3/1989 | Larson et al. | 15/312 R |
| 4,817,301 | 4/1989 | Belanger et al. | 34/243 C |

*Primary Examiner*—Chris K. Moore
*Attorney, Agent, or Firm*—Chilton, Alix & Van Kirk

[57] ABSTRACT

Control of a contactless cleaning element (18) in the cleaning line of a vehicle washing system, is accomplished by transmitting at least two energy beams (96, 98) transversely across the vehicle path. When the first beam (96) is interrupted by the passing vehicle, a motor device (64, 66) operates at a normal speed to move the cleaning element away from the vehicle. When the second beam (98) is interrupted, the motor device operates at a higher speed to move the cleaning element away at a faster rate. The cleaning element is pivotally connected by parallel arms (42, 72) to a gantry (12) so that actuation of the motor (64, 66) maintains substantially constant discharge angles relative to the vertical for two spaced apart discharge slots (102, 124) in the cleaning element. The motor (64) is mounted to the gantry 12 by a failsafe slidable carriage assembly (110).

15 Claims, 5 Drawing Sheets

PARALLEL ARM CAR WASH DRYER WITH MULTISPEED CONTOUR FOLLOW

BACKGROUND OF THE INVENTION

The present invention relates to cleaning elements in an automatic car wash line, and more particularly, to a dryer element of the type mounted to pivot in upward arc as a vehicle passes thereunder, while closely following but not touching the vehicle contour.

U.S. Pat. No. 4,651,442 discloses a nozzle assembly for a vehicle drying apparatus in which the drying station has an overhead gantry under which the vehicle travels when passing through the cleaning line. A boom is mounted to the overhead gantry for pivotal movement about a pivot axis extending in a direction transverse to the cleaning line. A dryer element has a housing with a plurality of slots oriented substantially transversely to the direction of the passing vehicle, thereby defining nozzles for discharging air on the vehicle surface to remove water or other cleaning liquid applied at a previous cleaning station. The dryer element is mounted on the boom at a point remote and in a fixed, spaced apart relation with the pivot axis for arcuate movement with the boom and provides a directional discharge of the drying air toward the passing vehicle. The dryer element and nozzle rotate relative to the boom to redirect the directional discharge of the drying air as the boom and nozzle follow the contour of the passing vehicle such that the air discharge angle relative to vertical, remains substantially constant. The dryer element follows the contour of the vehicle by means of a pair of wheels that are lightly preloaded downwardly by air cylinders. The necessity in the '422 patent of relying on a biased contact between the contour following roller wheels and the surface of the vehicle, carries with it the significant disadvantage that particulates and the like which find their way between the wheels and the surface of the automobile frequently result in scratches or other permanent marks on the vehicle. Relying on contact means for following the contour does offer the advantage that a very close spacing between the discharge nozzle and the vehicle surface can be maintained, which promotes good drying, but this advantage is significantly undermined by the frequency of scratching and the like of the vehicle finish.

In U.S. Pat. No. 4,730,401, a contactless dryer arrangement is disclosed, in which a dryer element is controlled for movement relative to the contour of the vehicle, by a light beam passing with clearance under the drying element and a device controller responsive to interruption of the light beam for operating the travel and lift motors associated with the drying element. This arrangement is disclosed, however, in the context of a washer and dryer station wherein the vehicle to be washed is stationary, and a frame travels longitudinally and vertically relative to the vehicle, to first perform a washing operation, and then a drying operation. Although this system is contactless, it is not readily adaptable for use in a gantry with pivoting boom arrangement of the type disclosed in U.S. Pat. No. 4,651,442, wherein both the vehicle and the dryer element are moving simultaneously.

Similarly in U.S. Pat. No. 3,533,422 a washing arrangement is described, with an indication that the same could be used for a dryer system, wherein the vehicle is driven into an enclosure within which a frame moves vertically and horizontally to apply fluid to the surface of the vehicle. In this patent, a contactless vehicle contour following means is disclosed, wherein a sensor assembly includes a plurality of sensor combinations for sensing the general elevational contours of the vehicle. Each of the sensor combinations includes an upper sensor unit and a lower sensor unit, each sensor unit including an emitter mounted on the frame on the first side of the vehicle and a receiver mounted on the frame on the second opposite side of the vehicle at the same level as the emitter, for transmitting and receiving radiant energy, respectively. One of the sensor combinations operates to control the movement of the wash bar when the frame is moved rearwardly and the other controls the movement of the wash bar during forward movement of the frame. In a given sensor combination, the lower sensor is connected to a suitable drive means to lower the wash bar when the receiver is activated by the transmission of radiant energy from the associated emitter. The other sensor unit is activated to move the spray arm upwardly relative to the vehicle and to contemporaneously therewith stop the longitudinal movement of the frame relative to the vehicle, when the transmission of radiant energy between the emitter and receiver is blocked. Thus, although multiple transmitters and receivers are employed, this system is not adapted for use in the pivoting boom type arrangement, wherein both the vehicle and the cleaning element are in motion.

U.S. Pat. No. 3,410,284 illustrates another contactless washing or drying system, wherein a dual sensor arrangement is utilized to control the movement of a washing or drying nozzle where both the vehicle and the cleaning element move relative to each other. In this system, the cleaning element moves only vertically, while the vehicle moves horizontally. One sensor is associated with a nozzle which discharges fluid in the direction a vehicle travel, and the other sensor is associated with a nozzle which discharges in the direction downstream of the vehicle travel. These sensors and nozzles are used in the alternative, depending on the longitudinal position of the vehicle, relative to the vertical movement of the cleaning element. As with the previously described systems, the control technique discloses this patent is not readily adaptable for use with the pivotable cleaning arrangement shown in the U.S. Pat. No. 4,651,442.

U.S. Pat. No. 4,718,439 illustrates a mountry and control arrangement for a cleaning element of a vehicle washing system, having a gantry and pivoting boom, the movement of which is controlled by two sets of radiant energy sensors. The system disclosed in U.S. Pat. No. 4,718,439 is adapted for following the contour of a vehicle with substantial clearance in connection with a washing or rinsing operation, e.g., with a space of approximately 10.5 inches. Even if the system of this patent were to be fitted with a drying element rather than a washing or rinsing element, the control system disclosed therein, which may be suitable for maintaining a spacing of 10.5 inches or so, would not be adequate for maintaining a nominal drying distance of approximately two inches, which is the maximum distance required for accomplishing superior drying.

SUMMARY OF THE INVENTION

Thus, although various arrangements are known for enabling a cleaning element to follow the contour of a vehicle in connection with the automated washing or drying thereof, the known techniques do not suggest a solution to the problem of providing an arrangement and control method, by which the cleaning, and more particularly the drying, element of a pivoting boom can safely and contactlessly follow within several inches the contour of a passing vehicle.

It is thus an object of the present invention to provide a contactless cleaning element system and method whereby the discharge nozzle of the cleaning element on a pivoting boom, can follow within several inches, the contour of a passing vehicle.

It is a further object that the cleaning element be driven by a motor arrangement which has the capability to make fine adjustments to the contour following path of the cleaning element, yet avoid contact with the vehicle when discontinuities or obstructions in the automobile profile are encountered, such as the transition from the front hood to the windshield.

It is a further object that the motor and associated control system perform in a relatively smooth manner, without hysteresis losses and the resulting uncertainties in the movement of the cleaning element.

These and other objects and advantages are accomplished in accordance with the present invention, by transmitting at least two energy beams transversely across the vehicle path. Each beam is sensed to detect interruption by the passing vehicle. When the first, or upstream beam is interrupted, the motor is actuated to lift the cleaning element along its arcuate path in the direction of the passing vehicle at a normal contour follow speed. If the downstream energy beam is interrupted, this indicates that the change in vertical profile of the vehicle exceeds the capability of the motor operating in the normal speed, to avoid contact between the cleaning element and the passing vehicle. Thus, the interruption of the second energy beam actuates the motor to raise the cleaning element in a second, rapid mode, that is faster than the normal mode, to avoid contact with the vehicle.

Preferably, the energy beam transmitters and receivers are in fixed spatial relation relative to the lowermost surface of the cleaning element, and are mounted to move with the cleaning element along the arcuate path defined by the pivoting of the boom. The boom is preferably actuated by a fluid driven piston and cylinder mounted on the gantry and having a piston rod connected to a strut which is rigidly attached to, and offset with respect to, the boom. The piston is connected to the gantry downstream of the cleaning element such that when the cylinder pressure increases, the piston rod advances in the downstream direction. Through its offset attachment to the boom, the actuating piston rod produces an arcuate, upstream movement path of the cleaning element. In the event of a loss of fluid pressure in the cylinder, the passing vehicle will contact safety rollers on the cleaning element and push the cleaning element according to the automobile profile, against relatively little resistance in the actuating cylinder.

In a further feature of the present invention, the cylinder itself is indirectly mounted to the gantry, by a sliding block which seats against the gantry during normal actuation of the boom, but which, in the event of loss of cylinder pressure and the consequent pushing of the cleaning element by the passing vehicle, slides, with the cylinder, in the downstream direction relative to the gantry, thereby further reducing the force required by the vehicle to push the cleaning element out of its way.

In yet a another feature of the present invention, the cylinder and strut arrangement actuates the boom such that an increasingly greater fluid pressure is required to raise the cleaning element, as the cleaning element travels farther along the prescribed arcuate path. This permits fine control and thus the maintenance of a relatively close yet contactless relationship between the cleaning element and the vehicle surface because of the minimization of hysteresis overshoot of the cleaning element.

An additional feature of the present invention is the use of two, spaced apart linear discharge nozzle slots in the cleaning element, oriented transversely to the direction of the vehicle movement. The first, or upstream slot is angled obliquely downward, in an upstream orientation relative to the vertical, whereas the downstream slot produces a higher pressure discharge oriented substantially vertically downward, or slightly in the obliquely downward and downstream direction. The cleaning element is mounted on a parallel arm boom arrangement which maintains substantially constant optimum angles relative to vertical for the upstream and downstream discharge nozzles, regardless of the position of the boom on the arcuate path. This optimum angle of the first nozzle, coupled with the closer spacing than is available with prior techniques, assures that the discharge air will actually lift the liquid from the surface of the passing vehicle and displace it predominantly rearwardly and to the sides, where it will be either further displaced by side panel dryers, or otherwise pushed back and "blown off" the vehicle. The first nozzle is followed by the second nozzle which, with its higher velocity discharge, is especially effective in the headlight, windshield wiper, and rear window areas.

BRIEF DESCRIPTION OF THE DRAWINGS

These and other benefits and advantages of the invention will be described in greater detail below with reference to the accompanying drawings, in which.

DESCRIPTION OF THE PREFERRED EMBODIMENT

Figure 1:
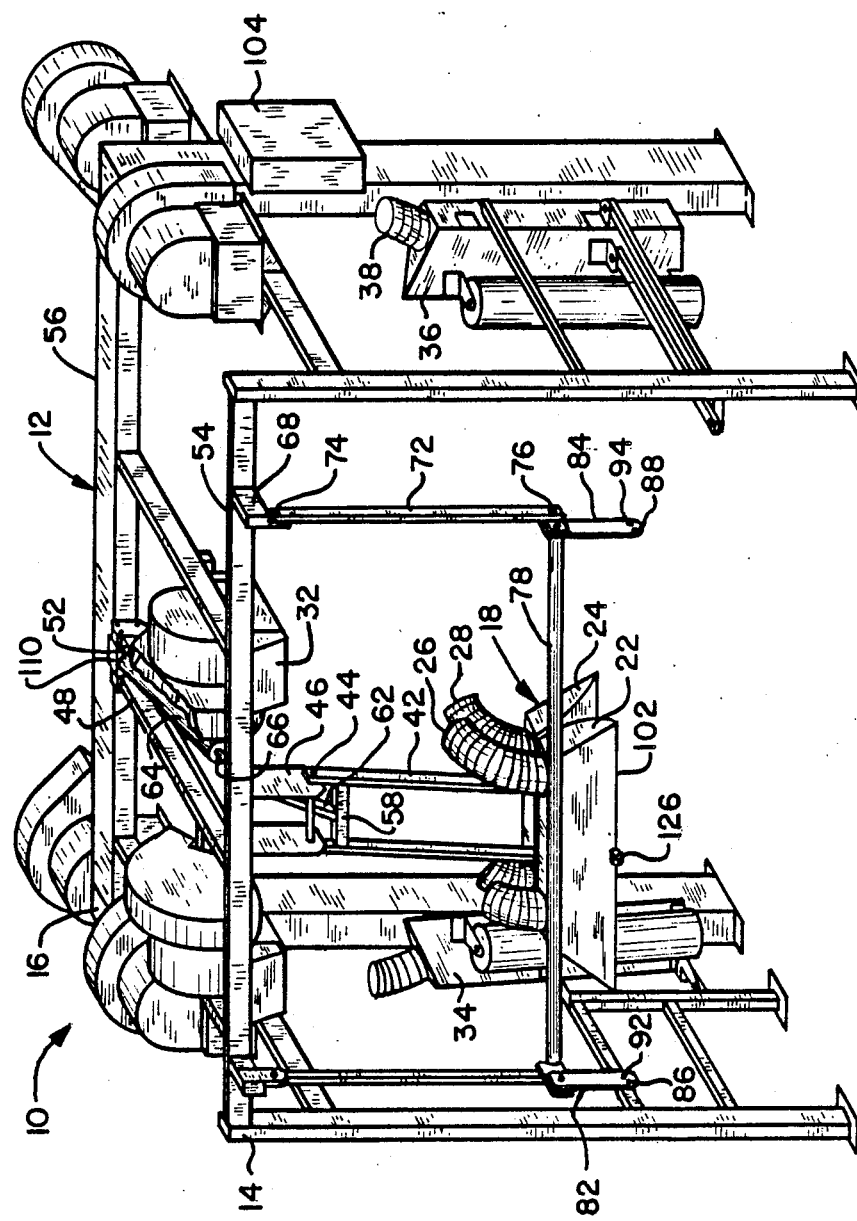
FIG. 1 is a perspective view of drying station in accordance with the present invention, wherein the vehicle enters from the left foreground.

FIG. 1 shows a cleaning station 10 which typically would be part of a vehicle washing system such as is described in U.S. Pat. No. 4,718,439, "Vehicle Washing System Having Apparatus For Following A Vehicle Surface Contour", the disclosure which is hereby incorporated by reference. The cleaning station 10 includes a gantry 12 having a first, upstream arch 14 and a second, downstream arch 16. The terms "upstream" and "downstream" as used herein refer to the direction of travel of a passing vehicle, which, with reference to FIG. 1, would be from the left foreground diagonally toward the upper right corner of the drawing.

A cleaning element 18, preferably a dryer element, is suspended between the first and second arches 14, 16, in a manner to be described in detail below. The cleaning element 18 preferably has an upstream plenum 22 and a downstream plenum 24, each of which is independently supplied with air as, by upstream plenum hoses 26 and downstream plenum hoses 28, respectively. Each plenum hose is connected to a respective one of a plurality of blowers 32, which are conveniently supported on the gantry 12.

The cleaning station 10 preferably includes substantially vertically oriented left side drying plenum 34 and right side drying plenum 36 each of which is supplied by one of two hoses 38. The side plena 34, 36, are disposed upstream relative to the normal travel path of the dryer element 18. One of the side plena is adjustable so that the space between plena 34,36 is about twelve inches greater than the width of the vehicle.

The upstream and downstream plenum 22, 24 are preferably rigidly connected together or commonly connected to a bracket or the like, which in turn is pivotly connected (as at 50 in FIG. 3) to a pair of spaced apart boom rails 42. The boom rails 42 are connected through a pivot axle 44, to a respective pair of hanger members 46 which depend substantially vertically from a respective pair of parallel beams, 48, 52. The beams 48, 52 are rigidly supported by the first and second cross beams 54, 56 of the first and second arches 14, 16. A strut member 62 is rigidly connected at one end to a cross bar 58 which rigidly spans the boom rails 42. A motor device, preferably pneumatic cylinder subassembly 64 including a piston rod 66, is pivotly connected to the other end of strut 62.

A pair of follower supports 68 project downstream of the first cross beam 54, spaced apart a distance greater than the width of any vehicle which is to pass through the vehicle washing system. A pair of spaced apart follower arms 72 are pivotally connected at 74 to follower supports 68, and at their lower ends, the follower arms 72 are pivotally to follower bracket 78 as at 76. The follower bracket 78 is pivotally connected to the dryer element, e.g., to upstream plenum 22. A pair of left and right sensor mounts 82, 84 depend from the follower arm 72 or the follower bracket 78, for the purpose of carrying a first, upstream transmitter 86 and associated first, upstream receiver 88, and a second, downstream transmitter 92 and associated second, upstream receiver 94. Radiant energy beams 96,98 (see FIG. 2) are directed between the respective first and second pairs of transmitters and receivers, to accomplish control of the movement of the dryer element as will be described more fully below. It should be appreciated, however, that the left sensor mount 82 and right sensor mount 84 are secured in a manner that provides a substantially constant geometric relationship between the sensors and transmitters, and the leading or lowermost edge 102 of the dryer element 18. A control panel 104 is mounted, preferably on the gantry 12, for providing the electrical and pneumatic connections and logic associated with the dryer station 10.

Figure 2:
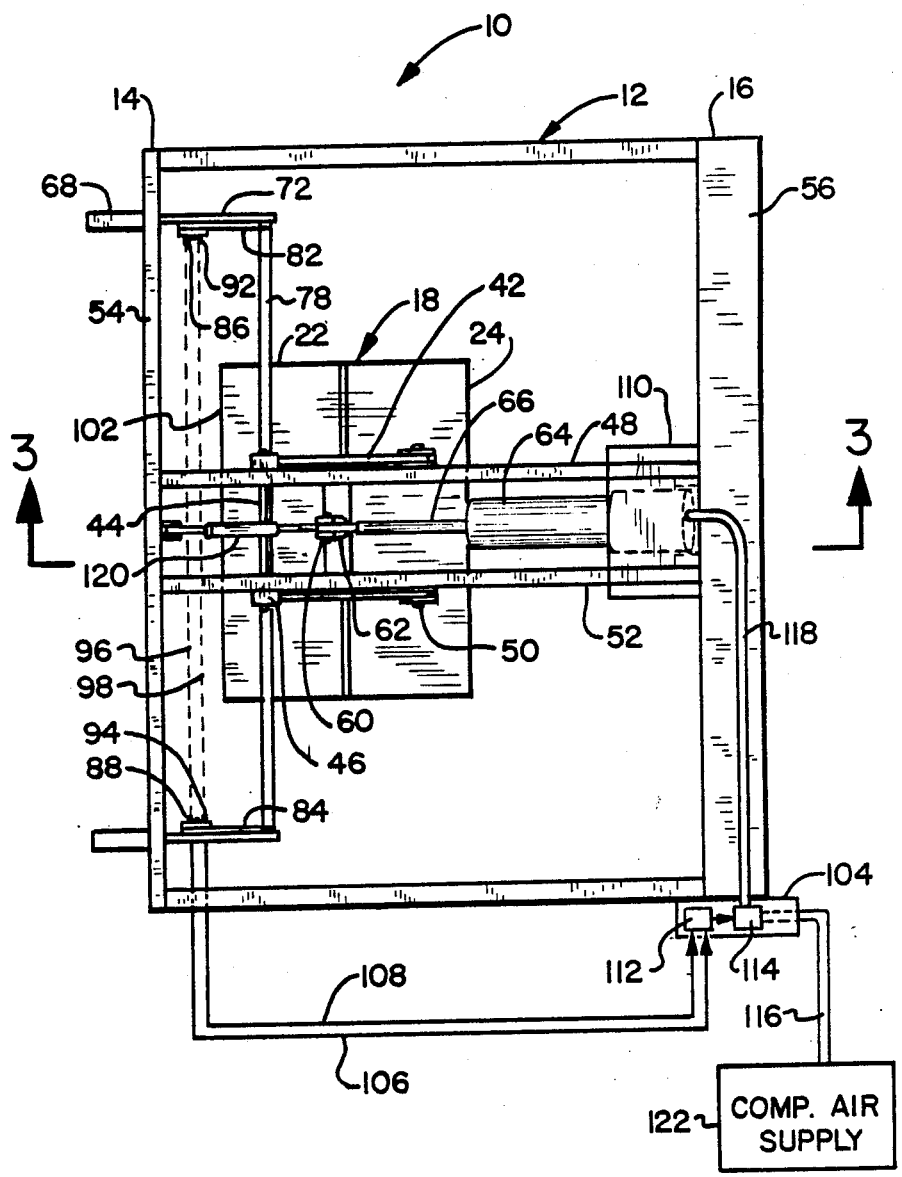
FIG. 2 is a plan view of the drying station shown in FIG. 1 with blower and certain other components deleted for clarity.
Figure 3:
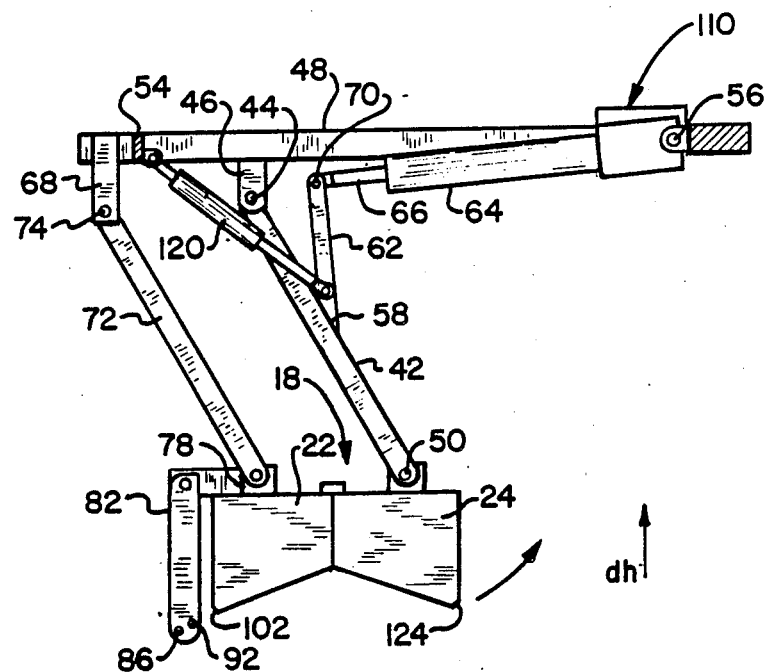
FIG. 3 is a side section view of FIG. 2 taken along line 3—3, showing the components associated with the actuation of the pivoting boom.

FIGS. 2 and 3 illustrate the details of the cleaning station, pertaining to the actuation and control of the cleaning element 18. In FIG. 2, first signal lines 106 and second signal lines 108 are shown schematically to connect the first transmitter 86 and first receiver 88, and the second transmitter 92 and the second receiver 94, respectively, to the controller 112 in the control box 104. Controller 112 defines the logic states or control algorithm for operating one or more solenoid valves 114 which have an inlet air supply hose 116 and one or more outlet cylinder supply hoses 118. The air supply hose 116 is connected to a compressed air supply 122 at, preferably, about 60 psi.

FIG. 2 and 3 also show that the cylinder 64 is pivotally mounted on a sliding box 110, which, in the normal position, is seated against the second cross beam 56. As cylinder 64 is pressurized and the piston rod 66 advances in the upstream direction, the leverage provided by strut 62, operating through the fixed connection to cross bar 58, generates a moment on boom rails 42 which tends to move the cleaning element in a counter clockwise direction as shown in FIG. 3.

The follower arms 72 are pivotly connected at 74 and 78 such that the follower arms 72 and boom rails 42 remain parallel to each other throughout the arcuate path of movement of the cleaning element 18, and, through the pivoted connections at 78 and 50, the cleaning element 18 remains in substantially the same orientation angular orientation relative to vertical.

The upstream, or first nozzle 102 is oriented transversely to the vehicle path and the slot is angled so that the discharge of air is in the downward and upstream direction relative to the vertical. The second, or downstream discharge nozzle 124 is parallel to and at substantially the same level as the first nozzle 102, but has a discharge slot which is narrower than slot 102. Thus, for the same blower capacity, slot 124 generates a higher velocity air stream, which is angled downwardly or slightly in the downstream direction. It has been found that for a drying element 18 which is controlled to follow the vehicle contour at a nominal distance of approximately 2–3 inches, the preferred discharge angle through first nozzle 102, relative to the vertical, is approximately 30 degrees, whereas the preferred discharge angle of the second nozzle 124 is less than 10 degrees. Due to the parallel arm relationship, these angles are maintained relative to the vertical, substantially throughout the path of the movement of the cleaning element 18.

As shown in FIG. 3, the second transmitter 92 and associated receiver are located slightly downstream and at a slightly higher elevation, than the first transmitter 86 and associated receiver. The energy beams provide the input to the controller 112 for operating the solenoid valves 114 in accordance with the following scheme:

TABLE 1

| Valve Position Summary | | | | |
|---|---|---|---|---|
| Is the Vehicle Passing? | If the First Beam is | And the Second Beam is | Then the First Valve | And the Second Valve |
| No | On | On | Lowers (No Influence) | Closes |
| Yes | On | On | Lowers | Closes |
| Yes | On | Off | Raises (Raises Rapidly) | Opens |
| Yes | Off | On | Raises | Closes |
| Yes | Off | Off | Raises | Opens |

Figure 5:
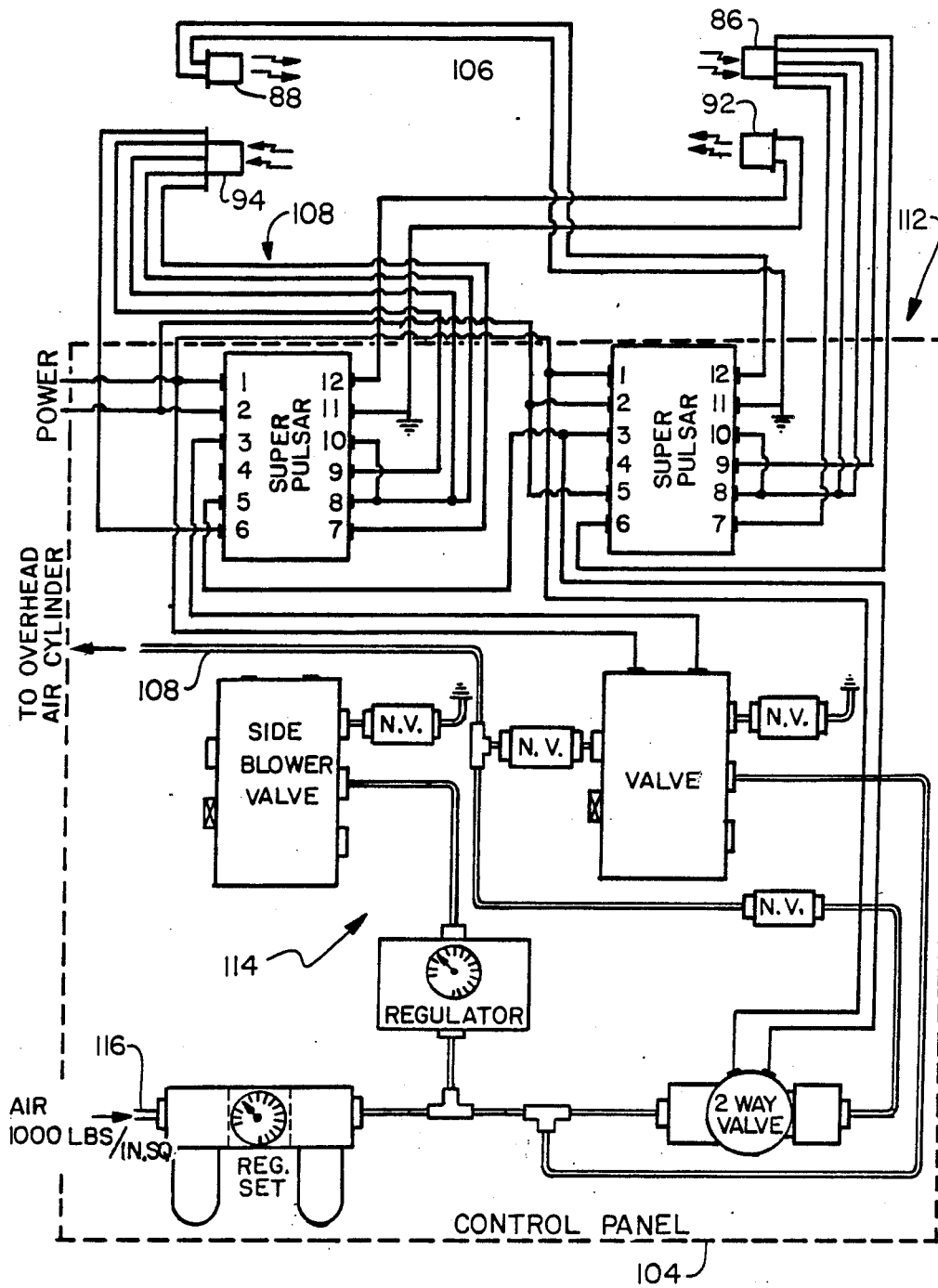
FIG. 5 is a schematic of a suitable pneumatic control system for implementing the two stage actuation of the cleaning element.

One implementation of such a control system is shown schematically in FIG. 5.

Preferably, the first solenoid valve is a four way valve having a first open position for increasing pneumatic pressure to the cylinder 64 to raise the boom 42, and a second open position for decreasing the pressure in the cylinder to lower the boom. The second solenoid valve has only open and closed positions, the open position occurring when the second beam has been interrupted. The opening of the second valve provides a rapid increase of pressure in the cylinder 64 and a corresponding rapid movement of the cleaning element 18 away from the passing vehicle. The pressure changes may be made by controlling the volume of fluid injected into the cylinder. As is also evident in the table, it is preferred that the first valve be operable to lower the element only when both beams are uninterrupted. It should be appreciated that other combinations may also be employed within the scope of the present invention, wherein at least two different beams are used to control the cleaning element as between movement at a first, nominal speed, and a more rapid movement away from the vehicle at a higher speed.

As shown in FIG. 3, in the preferred embodiment the leading edge of first nozzle 102 is located substantially vertically below the pivot axis 44, when the cylinder 64 is depressurized and the element 18 is at the bottom of its arcuate path of travel. This assures that any actuation, i.e., upstream displacement of the piston rod 66, will result in an upward, not downward, vertical component of the displacement of the element 18 along the arcuate path. For this condition to be satisfied, the boom rails 42 are, in the nominal or default condition, angled in the upstream direction when viewed from the cleaning element 18 to the pivot axle 44. The cylinder assembly 64 may be mounted so that the piston rod 66 operates on a line slightly below horizontal.

Preferably, a shock absorber 120 or the like, is interposed between the first cross beam 54 and the strut 62 to dampen the transfer of forces among the various structural components. Furthermore, the particular actuating linkages shown in FIG. 3 have the beneficial effect that as the dryer element 18 travels farther along the arcuate path, an increasing pressure and amount of air is required to be injected into the cylinder 64, to obtain a given increase in the vertical component of movement. Stated differently, for a given vertical component dh, the required change in pressure of the air in the cylinder is at a minimum when the dryer element is in the rest position as shown in FIG. 3, and increases as the position of the dryer element assumes a higher elevation along the arcuate path. In this respect, the preferred linkage is different from a crank because the higher the cleaning element rises along the arcuate path, the closer the piston rod 66 approaches parallelism with the boom rails 42, thus decreasing the mechanical advantage, even though the cylinder assembly 64 is pivotly mounted relative to the second cross beam 56. This feature promotes a smooth, fine control of the dryer element for following the vehicle profile in response to the air pressure change produced by the first valve based on the control signal generated by interruption of the first energy beam, because hysteresis or overshoot is minimized.

In a system such as the one described herein, where positive actuation of the cylinder assembly 64 is required to move the cleaning element upward, i.e., in the safe direction, it is important that a "fail safe" mode be provided to avoid damage to the automobile in the event of, for example, the loss of pneumatic pressure. This is accounted for in the present invention by use of a sliding box or carriage 110 which straddles the parallel beams 48, 52. In the nominal, or rest position of the dryer element 18, the sliding box 110 seats against the second cross beam 56, and upon actuation of the cylinder and the advance of the piston rod 66, the sliding box seats even more strongly against the second cross beam 56. In the event of loss of pressure, the piston rod 66 would tend to retract into the cylinder 64 and the cleaning element would drop along the arcuate path clockwise to the lowermost i.e., rest position. Prior to depressurization, the dryer element would have been only a few inches from the passing vehicle, so that such drop would likely lead to contact with the vehicle, on for example, safety wheel 126. It is important, however, that the cleaning element 18 not offer significant resistance to the vehicle continuing to pass under the gantry. For this reason, the sliding box 110 is free to move in the upstream direction as the vehicle pushes the dryer element 118 in the downstream direction, with the result that even the entire drive train for the dryer element offers little resistance to the passing vehicle.

As shown in FIG. 4, the upstream safety wheel 126 has a lowermost portion that is slightly lower than the leading edge of the upstream nozzle 102. Preferably, two additional safety wheels, a center wheel 128 and a downstream wheel 132, are provided for a similar purpose. The lower most portions of the wheels 126, 128, and 132 lie on an arc that is substantially concentric with, and of slightly greater diameter than the arc followed by the edges of the nozzles 102, 124.

Figure 4A:
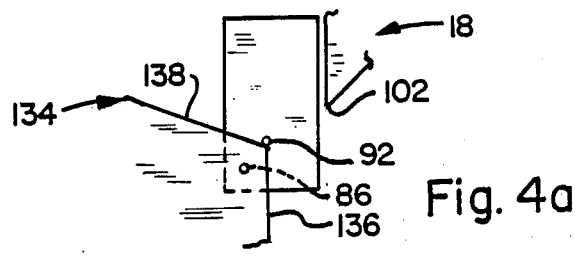
FIGS. 4 (a)-(g) are schematic illustrations of the relationship of the dual sensors and various positions along the vehicle profile in accordance with the invention.
Figure 4B:
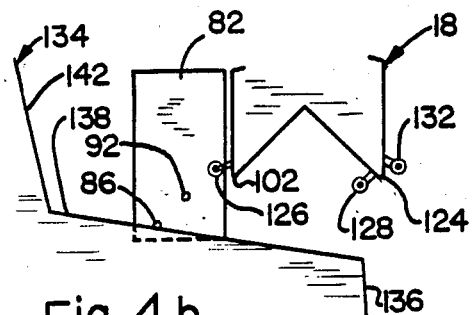

FIG. 4(a)-(g) illustrate how the dual beam sensor feature of the present invention provides improved performance relative to known cleaning elements, and in particular dryers. In FIG. 4(a), the vehicle 134 approaches form the left, and has a front grill 136, a front hood 138, and a front windshield 142. As the vehicle moves to the right relative to the sensor mount 82, a portion of the vehicle profile interrupts the beam generated by the first transmitter 86. The front grill 136 has advanced past the first transmitter 86 and, although the cleaning element 18 would be rising, the nearly vertical slope of the grill 136 overtakes the transmitter 86 and interrupts the beam from the second transmitter 92. This actuates the rapid move movement of the dryer element 18 so that the element rises quickly to a position, for example, as shown in FIG. 4(b). It should be appreciated that the schematics illustrated in FIG. 4(a)-(h) are not to scale and the ideal distance between the profile of the vehicle 134 and the nozzle 102 or 124, would be about two inches.

Again referring to FIG. 4(a), it may be seen that the discharge angle of nozzle 102 is aimed at the front grill 136 until the vehicle profile interrupts the beam from transmitter 92. Thereafter, after the cleaning element 18 has risen rapidly and then lowered to return to a close spaced relationship, the second nozzle 124, discharging substantially downwardly, provides an additional drying effect on the substantially vertical profile of the front grill 136, shown in FIG. 4(b). The first nozzle 102 discharges at an angle against the hood profile 138 and, with the close spacing, actually lifts the water and displaces it downstream, rather than only evaporating the water. It should be appreciated that over substantially most of the hood area, the second nozzle 124 provides a high velocity, trailing "clean up" effect which further enhances the effectiveness of the dryer station.

Figure 4C:
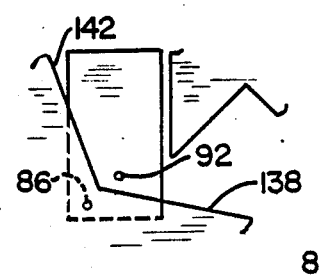
Figure 4D:
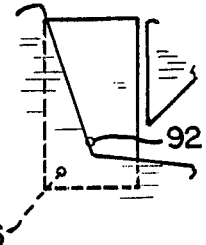

As shown in FIGS. 4(c) and (d), as the vehicle advances, another substantially discontinuous, quickly-changing profile occurs as a result of the slope of the windshield 142. As this slope interrupts the beam from transmitter 86, the dryer element will begin to rise at the normal speed, but the steep slope of the windshield 142 interrupts the beam from transmitter 92 as well, and the dryer element is actuated according to the rapid mode to move quickly upward, thereby avoiding contact with the windshield 142. It should be appreciated that during this upward movement, the first and second discharge nozzles 102, 124 will provide a cleaning effect on the windshield, although perhaps not at the ideal distance and angle, but nevertheless more effectively than with known cleaning elements.

Figure 4E:
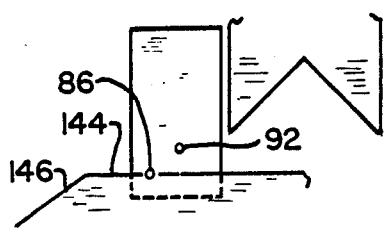
Figure 4F:
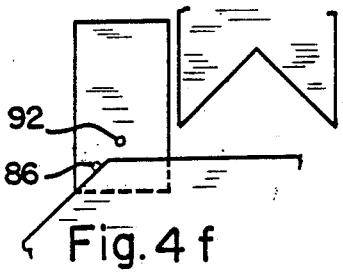
Figure 4G:
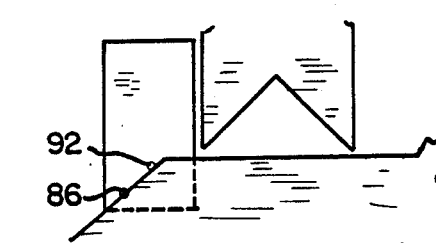

As shown in FIGS. 4(e)-(g), along the roof of 144 the control of the dryer element is substantially exclusively based on the transmitter 86, but as the transition from the roof to the rear windshield 146 occurs, the beam from transmitter 92 will be interrupted as the first transmitter 86 attempts to follow the rear windshield. In this situation, the ability to rapidly raise the cleaning element when the second transmitter beam 92 is interrupted, enables the dryer element to maintain a closely spaced relationship from the vehicle profile over a greater portion of the vehicle, than is otherwise available with known cleaning elements. This is because the interruption of the beam from transmitter 92 acts as a "safety net" to quickly pull the dryer element away from the vehicle even when the dryer has closely followed the surface of the vehicle based on the operation of transmitter 86.

Figure 4H:
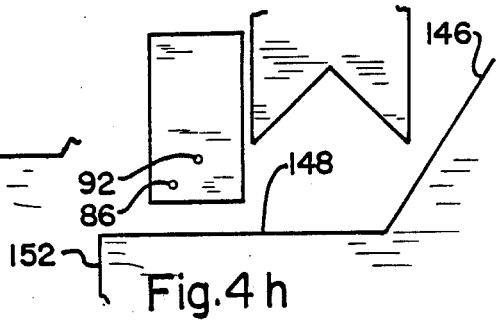

As shown in FIG. 4(h), the second discharge nozzle 124 is substantially ideally oriented to dry the rear windshield 146 and, upon the passage of the vehicle, the second nozzle 124 will have a beneficial drying effect on the rear tail light area 152.

It should be appreciated that the parallel arm mounting of the drying element, the two discharge nozzle slots, the arrangement of the actuating cylinder and associated linkages for actuating the boom, and the dual beam control system having nominal and rapid movement modes, provide superior performance relative to known vehicle dryer stations, particularly where the drying is to be performed using a pivoting boom cleaning element. In a typical washing line where the vehicles are traveling through at a rate of 60 feet per minute (which can vary), the nominal speed of the cleaning element in the vertical direction would be in the range of about 1-2 inches per second, whereas in the rapid mode, the vertical speed would be in the range of about 4-6 inches per second. Preferably, the total vertical travel of the cleaning element would be from about 42 to 84 inches above ground level.

We claim:

1. A method for controlling a cleaning element in a cleaning line of a vehicle washing system, the system including an overhead gantry located along the cleaning line under which the vehicle passes, a boom carrying the cleaning element and mounted to the overhead gantry for pivotal movement about a pivot axis extending in a direction transverse to the cleaning line, vehicle contour following means connected with the boom for controlling pivotal movement of the boom relative to the vehicle surface, said following means including means coupled to the boom in the vicinity of the cleaning element and spaced from and in non-contact relation with the vehicle surface, for providing an energy beam transversely across the vehicle path, means for sensing an interruption in the energy beam by the contour of the passing vehicle, and motive means responsive to the beam sensing means for moving the boom to maintain the cleaning element in non-contact relation to the vehicle, wherein the improvement comprises the steps of:
    transmitting at least two beams transversely across the vehicle path;
    sensing the interruption of a first one of said energy beams by the passing vehicle and operating said motive means in a normal mode to move the cleaning element away from the passing vehicle at a first velocity while only said first beam is interrupted; and
    sensing the interruption of a second one of said energy beams by the passing vehicle and operating said motive means in a rapid mode to move the cleaning element away from the passing vehicle at a second velocity greater than the first velocity, while the second beam is interrupted.

2. The method of claim 1, wherein the step of transmitting at least two energy beams includes the steps of transmitting the first energy beam horizontally at a first elevation upstream of the cleaning element in the cleaning line and transmitting the second energy beam horizontally at a second elevation higher that the first elevation and downstream of the first beam.

3. The method of claim 1, wherein the step of transmitting the two energy beams includes the step of maintaining the energy beams at substantially constant respective vertical distances from the lowermost extent of the cleaning element.

4. The method of claim 1, wherein the motive means is fluidly operated and the steps of operating the motive means to move the cleaning element at the first and second velocities include the steps of supplying fluid at a first pressure to operate the motive means in the normal mode and supplying said fluid at a second, higher pressure to operate the motive means in the rapid mode.

5. Apparatus for controlling a cleaning element in a cleaning line of a vehicle washing system, the system including an overhead gantry located along the cleaning line under and mounted to the overhead gantry for pivotal movement about a pivot axis extending in a direction transverse to the cleaning line, vehicle contour following means connected with the boom for controlling pivotal movement of the boom relative to the vehicle surface, said following means including means coupled to the boom in the vicinity of the cleaning element and spaced from and in non-contact relation with the vehicle surface, for providing an energy beam transversely across the vehicle path, means for sensing an interruption in the energy beam by the contour of the passing vehicle, and motive means responsive to the beam sensing means for moving the boom to maintain the cleaning element in non-contact relation to the vehicle, wherein the improvement comprises:
    said means for providing an energy beam includes means for transmitting at least two energy beams transversely across the vehicle path; and
    said means for sensing and said motive means include means for sensing the interruption of a first of said energy beams by the passing vehicle and operating said motive means in a normal mode to move the cleaning element away from the passing vehicle at a first velocity while only said first beam is interrupted, and means for sensing the interruption of a second of said energy beams by the passing vehicle and operating said motive means in a rapid mode to move the cleaning element away from the passing vehicle at a second velocity greater than the first velocity, while the second beam is interrupted.

6. The apparatus of claim 5, wherein said means for transmitting at least two energy beams include,
    transmitter mounting means situated upstream of the cleaning element and movable with the cleaning element for maintaining a constant geometric relation to the cleaning element throughout the range of pivotable movement of the boom,
    a first beam transmitter carried by the mounting means at a first elevation, and
    a second beam transmitter carried by the mounting means downstream and at a higher elevation relative to the first transmitter.

7. The apparatus of claim 5, wherein said motive means includes,
    a carriage mounted on said gantry above the cleaning element for reciprocal movement along the direction in which the vehicle passes, said carriage having a downstream limit seated position,
    a fluid actuated cylinder and piston mounted to said carriage downstream and above said cleaning element and having a piston rod pivotally connected to said boom such that when the carriage is in the seated position actuation of the piston extends said piston rod to produce an arcuate, upward movement of said cleaning element in the downstream direction, and
    means for supplying actuating fluid to the cylinder at first and second pressures to raise the cleaning element at the first and second velocities in response to the interruption of the first and second energy beams, respectively.

8. The apparatus of claim 7, wherein the carriage, cylinder and piston rod are interconnected such that when the cylinder is depressurized, a force applied to said cleaning element by a passing vehicle will push the cleaning element in the downstream direction, pull said carriage from the seated position, and advance said carriage and cylinder in the upstream direction.

9. A dryer element in a cleaning line of a vehicle washing system, the system including an overhead gantry located along the cleaning line under which the vehicle passes, a boom carrying the dryer element and mounted to the overhead gantry for pivotal movement about a pivot axis extending in a direction transverse to the cleaning line, vehicle contour following means connected with the boom for controlling pivotal movement of the boom relative to the vehicle surface, said following means including means coupled to the boom in the vicinity of the dryer element and spaced from and in non-contact relation with the vehicle surface, for providing an energy beam transversely across the vehicle path, means for sensing an interruption in the energy beam by the passing vehicle, and motive means responsive to the beam sensing means for moving the boom to maintain the dryer element in closely spaced relation to the vehicle, wherein the improvement comprises:
    said dryer element including an upstream plenum having an upstream discharge slit oriented transversely to the direction of the passing vehicle and a downstream plenum having a downstream discharge slit oriented transversely to the direction of the passing vehicle and located downstream of the upstream slit, the upstream slit having a discharge direction oriented obliquely downward and upstream and the downstream slit having a discharge direction oriented other than upstream;
    said boom contour following means and motive means including,
    the boom being pivotally connected at its lower end to the dryer element and extending generally upwardly and in the upstream direction from the dryer element,
    means at the upper end of the boom for pivotally connecting the boom to the gantry for movement about said transverse axis,
    a strut member rigidly connected to the boom intermediate the boom pilot connection to the dryer element and to the gantry and oriented obliquely upwardly and in the upstream direction from the connection to the boom,
    a cylinder and piston subassembly supported by the gantry downstream of the strut and having a piston rod pivotally connected to the strut member,
    a follower arm pivotally connected to the dryer element and to the gantry such that said follower arm remains parallel to the boom as the boom pivots about said transverse axis;
    whereby actuation of the cylinder extends the piston rod in the upstream direction and pivots the dryer element on an arcuate path in the downstream direction such that the orientations of the upstream and downstream discharge slits remain substantially constant relative to vertical.

10. The apparatus of claim 9, wherein,
    the gantry includes first and second arches oriented transverse to the passing vehicle in spaced apart relation upstream and downstream of the dryer element, respectively, the first arch including a first cross beam and the second arch including a second cross beam;
    said follower arms is in the form of arms which depend from said first cross beam;
    a pair of parallel beams are rigidly supported between said first and second cross beams and extend in the direction of the passing vehicle;
    said boom is in the form of a pair of rails which depend from said parallel beams; and
    said cylinder and piston subassembly is supported by said parallel beams.

11. The apparatus of claim 10, wherein
    said vehicle contour following means includes a pair of sensor mounts depending from the follower arms,
    said means for providing an energy beam and means for sensing include means on the sensor mounts for transmitting and receiving at least two energy beams transversely across the vehicle path; and
    said motive means include control means responsive to interruption of the energy beams, for actuating the piston at a first extension speed when only one energy beam is interrupted and a second, faster speed when the second energy beam is interrupted.

12. The apparatus of claim 9, wherein said motive means includes,
    a carriage mounted on said gantry above the dryer element for reciprocal movement along the direction in which the vehicle passes, said carriage having a downstream limit seated position,
    said cylinder and piston subassembly, mounted to said carriage downstream and above said dryer element and having a piston rod pivotally connected to said boom such that when the carriage is in the seated position actuation of the piston advances said piston rod to produce an arcuate, upward movement of said dryer element in the downstream direction, and means for supplying actuating fluid to the cylinder to raise the dryer element in response to the interruption of said energy beam.

13. The apparatus of claim 12, wherein the carriage, cylinder and piston rod are interconnected such that when the cylinder is depressurized, a force applied to said dryer element by a passing vehicle will push the dryer element in the downstream direction, pull said carriage from the seated position, and advance said carriage and cylinder in the upstream direction.

14. A method for controlling a cleaning element in a cleaning line of a vehicle washing system, the system including a boom carrying the cleaning element, vehicle contour following means connected with the boom for controlling the movement of the boom relative to the vehicle surface, said following means including means in non-contact relation with the vehicle and movable with the boom for providing an energy beam transversely across the vehicle path, means for sensing an interruption of the energy beam by the contours of the passing vehicle, and motive means responsive to the beam sensing means for moving the boom to maintain the cleaning element in closely spaced relation to the vehicle, wherein the improvement comprises the steps of:

transmitting at least two energy beams transversely across the vehicle path;

sensing the interruption of a first one of said energy beams by the passing vehicle and operating said motive means in a normal mode to move the cleaning element away from the passing vehicle at a first velocity while only said first beam is interrupted; and sensing the interruption of a second one of said energy beams by the passing vehicle and operating said motive means in a rapid mode to move the cleaning element away from the passing vehicle at a second velocity greater than the first velocity, while the second beam is interrupted.

15. The method of claim 14, wherein the step of operating the motive means in the normal mode includes, moving the cleaning element toward the passing vehicle while neither beam is interrupted, and moving the cleaning element away from the passing vehicle at said first velocity while only the first beam is interrupted.

* * * * *